(12) United States Patent
Sæthre et al.

(10) Patent No.: US 6,346,592 B1
(45) Date of Patent: *Feb. 12, 2002

(54) SELF-ACTIVATED POLYMER PARTICLES WITH A NARROW SIZE DISTRIBUTION AND PROCEDURE FOR PRODUCTION THEREOF

(75) Inventors: Bård Sæthre, Porsgrunn; Steinar Pedersen, Skien, both of (NO)

(73) Assignee: Norsk Hydro ASA, Oslo (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,260

(22) PCT Filed: Jan. 16, 1998

(86) PCT No.: PCT/NO98/00016

§ 371 Date: Aug. 26, 1999

§ 102(e) Date: Aug. 26, 1999

(87) PCT Pub. No.: WO98/31714

PCT Pub. Date: Jul. 23, 1998

(30) Foreign Application Priority Data

Jan. 20, 1997 (NO) .................................................. 970247

(51) Int. Cl.⁷ .............................................. C08F 118/02
(52) U.S. Cl. .......................... 526/319; 521/56; 528/355; 528/408
(58) Field of Search ........................... 521/56; 526/319; 528/355, 408

(56) References Cited

U.S. PATENT DOCUMENTS

| | | | | |
|---|---|---|---|---|
| 4,663,265 A | * | 5/1987 | Uytterhoeven et al. | 430/114 |
| 4,962,133 A | * | 10/1990 | Chromecek et al. | 521/56 |
| 4,962,170 A | | 10/1990 | Chromecek et al. | |
| 5,312,873 A | * | 5/1994 | Gregor et al. | 525/348 |
| 5,350,808 A | * | 9/1994 | Besecke et al. | 525/330.5 |
| 5,854,384 A | * | 12/1998 | Kuroda et al. | 528/355 |

FOREIGN PATENT DOCUMENTS

| | | |
|---|---|---|
| EP | 0636635 | 2/1995 |
| EP | 0743328 | 11/1996 |
| GB | 2244713 | 12/1991 |
| WO | 9640809 | 12/1996 |
| WO | WO 96/40809 | * 12/1996 |
| WO | 9740076 | 10/1997 |

OTHER PUBLICATIONS

"Textbook of Polymer Science" 3–d edition, F. Bilmeyer, Jr. John Willey and Sons, N–Y, p. 132–133.*

Lok et al., "Particle size control in dispersion polymerization of polystyrene", Canadian journal of chemistry, vol. 63, 1985, pp. 209–216.

File WPI, Derwent accession No. 93–357201, Mitsubishi Rayon Co Ltd: "Prodn. of polymer fine particles having good dispersibility, for e.g. binder—comprises no–aq. dispersion polymerising vinyl monomers in presence of dispersion stabilisers"; & JP,A,5262804, 931012.

File WPI, Derwent accession No. 92–004508, Mita Ind Co Ltd: "Prepn. of resin beads useful as toner for electrophotography—comprising dispersion polymerisation of vinyl: aromatic cpd. and (meth)acrylate in presence of dispersion stabiliser"; JP,A,3258803,911119.

File WPI, Derwent accession No. 94–186406 Nippon Gosei Gomu Kk: "Mfg. highly crosslinked polymer particles for chromatography, LCD, diagnostic carrier, etc.—by dispersion polymerisation in soln. contg. dispersion stabiliser, azo initiator and peroxide, persulphate and/or oxygen"; JP,A, 6122703, 940506.

File WPI, Derwent accession No. 93–121412, Ricoh Kk: "Polymer particles prodn. having narrow particle dia. distribution—by polymerising vinyl monomer soluble in hydrophilic liq. in presence of chain transfer agent and polymeric dispersant"; & JP,A,5059109, 930309.

File WPI, Derwent accession No. 86–294535, Japan Synthetic Rubber Co Ltd: "Spherical polymer particles prepn.— by mixing aq. dispersion of seed particle material with aq. dispersion of monomer and polymerisation initiator"; & JP,A,61215602,860925.

* cited by examiner

Primary Examiner—David W. Wu
Assistant Examiner—Tanya Zalukaeva
(74) Attorney, Agent, or Firm—Wenderoth, Lind & Ponack, L.L.P.

(57) ABSTRACT

A procedure for preparing compact and spherical self-activated polymer particles of vinyl monomers having a narrow or monodisperse size distribution in accordance with a special precipitation polymerization process in a polar organic medium, possibly in an organic polar medium mixed with water. The medium is a good solvent for the monomer and a poor solvent for the polymer. All ingredients are initially dissolved in the medium and when polymerization has been initiated, formed polymer precipitates from solution and by the aid of the dispersion stabiliser the polymer particles are kept apart as free spherical beads. The polymerization takes place with a temperature profile which produces a scattered chain length distribution, increases the conversion speed and reduces the particle size distribution. The method for producing the particles also achieves an increased degree of freedom for the production of particles with a certain particle size in a given conversion time. The particles, which may be cross-linked, can also be made functional either by an active group through copolymerization or by grafting reactions at a late stage of polymerization or in a subsequent treatment stage.

20 Claims, No Drawings

SELF-ACTIVATED POLYMER PARTICLES WITH A NARROW SIZE DISTRIBUTION AND PROCEDURE FOR PRODUCTION THEREOF

CROSS-REFERENCE TO RELATED APPLICATION

This application is a 371 application of International Application No. PCT/NO98/00016 filed Jan. 16, 1998.

BACKGROUND OF THE INVENTION

1. Field of the Invention

The present invention concerns a procedure for producing polymer particles with a narrow size distribution in the range 0.5–15 µm by means of free radical polymerization of vinyl monomer(s), which is(are) easily soluble in the polymerization medium, while the polymer precipitates out with subsequent nucleation of the particles.

There is an increasing need for small polymer particles with a narrow size distribution within chromatography, biological separation, catalyst production, carriers for catalysts, immunoassays, peptide synthesis, coating powders, toners, spacing indicators, viscosity modifiers, gloss modifiers, ion exchangers and in many other areas. The small polymer particles can also be used as seed in the production of larger particles of vinyl monomers or resins. In this connection, the seed may only constitute a small part of the overall particle so that the properties may be completely different from the initial particle. The areas of application of the particles increase considerably with activation with functional groups which, in themselves, provide the special properties or which can be used as coupling points for other groups/compounds.

Small polymer particles mean particles in the size range 0.5 to 15 micrometres. The term monodisperse particles means that all particles are of identical size. Since such systems have homogeneous properties, this may be advantageous for some applications but in most cases it is sufficient to have a narrow distribution, for example with a variation coefficient, CV, in the range 5–25%.

2. Description of Related Art

Conventional particles are produced by suspension polymerization, emulsion polymerization, seed polymerization, activated seed polymerization, dispersion polymerization and related techniques.

Suspension polymerization results in particles with a wide size distribution, often 10 to 200 micrometres, which makes it necessary to classify the particles and remove the desired fraction, which is thus usually only obtained in small quantities. In standard emulsion polymerization, particles are mostly produced with a diameter in the range 0.1 to 1 micron and it is not common to make particles larger than 1 micron with this technique. Norwegian patent application no. 139410 describes a so-called two-stage swelling technique, activated swelling, and the subsequent polymerization which makes possible the production of monodisperse particles in a wide size range. The disadvantage of this technique is that each swelling stage is very time-consuming. This is on account of the long time it takes to disperse the swelling reagent in water and transport it through the water phase and into the particles which are to grow. If not all the swelling agent is swelled in and drops remain in the water phase, the result is large polymer particles, which must be removed from the main product before use.

Dispersion polymerization (precipitation polymerization) can be regarded as a special type of deposition polymerisation and was intended, from the start, as an alternative to traditional emulsion polymerisation. The typical components of a dispersion polymerisation process are monomer (s), an initiator, a steric stabiliser, possibly also a co-stabiliser and a medium in which these components easily dissolve. Typical dispersion polymerisation processes are carried out in non-polar organic media such as hydrocarbons. Recently, polar media such as alcohols, mixtures of alcohols, water and ethers have also been taken into use. The polymer which is formed, most commonly with free radical or anionic polymerisation, is, however, insoluble in the medium and is stabilised against coagulation with the steric stabiliser. The reason why particles with a narrow distribution are formed with this polymerisation technique is not fully known. However, some explanations have been given (for example, K. E. Barrett, Br. Polym. J., 5, 259, 1973 and E. Shen et al., J. of Pol. Sci., 32, 1087, 1994).

One of the disadvantages of dispersion polymerisation is that the reactions traditionally take a very long time. In Shen et al. (Journal of Polymer Science; Part A: Polymer Chemistry, Vol. 31, 1393–1402, 1993), polymerisation times of 48 hours for the production of PMMA particles are reported. The reason for this long time is that the temperature has a decisive effect on the size of the particles which are formed. A higher temperature for increased polymerisation speed also produces an increased quantity of free radicals and increased solubility of the oligomer/polymer. This also results in the particle size increasing and a tendency for the particle distribution to be wider.

None of the references stated solves the problem of producing polymer particles which are easily activated, i.e. which contain a chemical functionality or substances which allow the particles to be used directly for special applications and further modifications. Nor do the references provide a complete solution to how the organic media are to be recirculated for reuse. With the large quantities of solvent and stabiliser used in the dispersion polymerisation process, this is hardly advantageous from a financial or an environmental standpoint. Shen et al. decanted the reaction medium from the particles and used it again after having corrected it for unconverted monomer and undecomposed initiator. This was reported as having been done three times with only a slight increase in particle diameter. The fact that the problem of reuse has not been fully solved, together with the disadvantageously long cycle time for production, makes the described methods unfavourable for use in practical applications, for example industrial production. Commercial exploitation of dispersion polymerisation (precipitation polymerisation) in polar organic media requires a shorter polymerisation time than that which has traditionally been described.

BRIEF SUMMARY OF THE INVENTION

Surprisingly, it turned out to be possible to use a required temperature, most advantageously lower than the average polymerisation temperature in the process, at the start of polymerisation (during the deposition/formation of the particles) to control the size of the particles and then to increase the temperature to achieve a satisfactory conversion speed without this resulting in an unfavourable size and distribution of the particles produced. The reaction time could thus be reduced to times of about 10 hours for tests with methyl methacrylate, which, for approximately 90% conversion, previously took about 48 hours. This makes the new process more flexible than the process previously reported. In addition, the present invention makes it possible to use a varying concentration of initiator for the production of a certain particle size without varying any process parameters other than the temperature.

DETAILED DESCRIPTION OF THE INVENTION

The parameters for controlling the particle size in a dispersion polymerisation system are the polymerisation medium, the polymerisation temperature, the initiator type and concentration, the stabiliser type and concentration and the monomer type and concentration.

When the solubility of the oligomer/polymer molecule increases in the medium, the chain length before precipitation will increase. The size of the particles which are formed will thus increase. The solubility of the oligomer/polymer molecules also increases with increasing temperature. Thus the chain length at which the molecules precipitate out will increase. The concentration of radicals will also increase with increasing temperature with a consequent increase in the decomposition speed of the initiator. Increased radical concentration results in the speed at which the chains precipitate out increasing. At the same time, the adsorption of the stabiliser on the precipitated/agglomerated particles will decrease on account of the increased solubility of the stabilising agent in the medium. As the initiator concentration increases, the radical concentration increases and thus also the speed at which the oligomer/polymer chains precipitate out. Since the adsorption of the stabiliser is slow, the increased aggregation results in larger particles being formed. With the same background, initiators with a shorter half-life produce larger particles than initiators with longer half-lives. Increasing stabiliser concentration increases both the speed at which the stabiliser is adsorbed on the particles and the viscosity of the medium. Both factors reduce the size of the particles which are formed. Increasing molar weight of the stabiliser increases the viscosity of the medium and thus reduces the particle size. Increasing monomer concentration most often increases the solubility of the oligomer/polymer molecules in the medium and the particle size increases.

The present invention provides a procedure for producing polymer particles with a narrow size distribution in the range 0.5–15 μm by free radical polymerization of vinyl monomer (s) which is(are) easily soluble in the polymerization medium while the polymer precipitates out with subsequent nucleation of the particles, characterised in that, after the number of particles is constant, the temperature is gradually increased to a new setpoint over a certain interval of time so that the conversion speed is increased and so that a fraction of molecules with a lower molecular weight is formed.

An activator/initiator or a solution containing an activator/initiator, which is heated before being added to the reactor, can be used.

The agitation speed can be increased during the addition of the activator/initiator or a solution containing an activator/initiator.

The present invention also provides a procedure for activating polymethyl methacrylate, PMMA, particles produced by precipitation polymerization in a polar organic medium with epoxy groups, characterised in that an epoxy vinyl compound with an advantageous copolymerization constant in a ratio of 0–50% weight of methyl methacrylate, MMA advantageously 0–15% weight, is added to the reactor from the start or is added subsequently in batches or continuously.

The present invention also provides a procedure for producing cross-linked polymethyl methacrylate, PMMA, particles by precipitation polymerization in a polar organic solvent, characterised in that a multi-functional vinyl monomer with an advantageous copolymerization constant with methyl methacrylate, MMA, in a ratio of 0.001–5%, most advantageously 0.1–0.5%, of MMA is added to the reactor from the start or is added subsequently in batches or continuously.

Both a multi-functional vinyl monomer and an epoxy-activated vinyl monomer with an advantageous copolymerization constant with methyl methacrylate, MMA, can be used.

A chain-transfer agent can be added, most advantageously in an amount of 0–1.0% weight of vinyl monomer, at any time after the interval for nucleation of the particles is over.

The present invention also provides a procedure for activating polymethyl methacrylate, PMMA, particles produced by precipitation polymerization in a polar organic medium as described above, characterised in that ammonia, $NH_3$, is added to the medium at a late stage of the polymerization.

The present invention also provides a procedure for producing particles activated by an activator/initiator in precipitation polymerization in an organic medium, characterised in that such a large surplus of oil-soluble activator/initiator is used in the polymerization of the particles that it is not necessary to add any more when the particles are used as seed in a subsequent polymerization stage. A polar medium, most preferably water, is added gradually during the evaporation of the organic medium.

Another advantage of the present invention is that the molar weight of the polymer chains in the particles can be controlled with this method of regulating the temperature. The chain length for methyl methacrylate, MMA, styrene and other vinyl monomers will often depend a great deal on the initiator concentration and polymerisation temperature. The molar weight and molar weight distribution also have a decisive effect on the swelling of the particles as increasing fractions of low-molecular chains in the particles will activate further swelling as this becomes more thermodynamically favourable. The particles thus become more useful for further modification and as seed in a subsequent polymerisation process.

This new method for producing polymer particles of a given size, average molecular weight and molecular weight distribution with a satisfactory conversion speed during polymerisation entails, in principle, no limitations regarding choice of monomer or monomer composition, solvent, stabiliser or initiator. The examples are based on the polymerisation of methyl methacrylate and styrene as the main monomer in a polar organic medium as this is currently the most interesting method from a technical/financial standpoint.

It is also possible to use a chain-transfer agent to increase further the fraction of low-molecular polymers in the particles. It was found possible to add a chain-transfer agent towards the end of polymerisation without this affecting the particle size and particle distribution. The chain-transfer agents traditionally known for free radical polymerisation of the vinyl monomer used can be used, with compounds containing sulphur such as 2-ethyl hexyl thioglycolate and butyl mercaptan, which are most preferred for methyl methacrylate and styrene respectively.

In order to improve profitability and the environment, the reaction medium in a dispersion polymerisation process should be recirculated. The number of times the medium can be used before it is necessary to use separation processes or destruction depends to a certain extent on the conversion in the process. Low and varying conversion results in varying concentrations of initiator and monomer. Both of these components affect the formation and growth of the particles and the repeatability from batch to batch decreases. The temperature profile through the polymerisation increases conversion and the variations from batch to batch become smaller. In order to increase the repeatability in connection with reuse of the medium, it was found advantageous, in addition to correcting for residual monomer and initiator in the recirculated medium, to measure and correct for the quantity of stabiliser. In this way, it was found possible to increase the number of recirculations without the particle size and distribution being affected. A simple and advantageous method for determining the stabiliser concentration is to measure the electrical conductivity of the medium. Another method is titration, either on an active group in the stabiliser or the medium's surface tension.

Another problem of commercial exploitation of dispersion polymerisation is that temperature gradients occur in connection when the initiator is added. In turn, this produces a wider distribution of particles.

The problem of inhomogeneity becomes greater the greater the size of the reactor as the ratio of the reaction volume to the reactor's cooling surface increases in connection with an increase in scale. High agitation intensity throughout the polymerisation is not very advantageous as it is possible to obtain an unstable system with coagulation. Increased agitation only during addition of the initiator and possibly other chemicals reduces this inhomogeneity and it was found that the particle distribution became narrower.

It was also found advantageous to preheat the initiator solution preferably to a temperature just below the self-accelerating decomposition temperature, SADT, of the initiator just before adding it to the reactor. This also reduces the temperature gradients in the polymerisation system during and just after the addition and the particle distribution becomes narrower.

The most widely used initiators in polymerisation in a dispersion system with polar media are azo-initiators with 2,2-azobis(isobutyronitrile), AIBN, as the most preferred. This type of initiator gives off nitrogen gas during decomposition. This not always desirable and can also, in the application of the product, the particles, have negative effects if the residual initiator is not removed. Therefore, for some applications it has been found advantageous to use other types of initiators.

For the present invention, it was found possible to use oil-soluble peroxides such as the diacyl peroxides didecanoyl peroxide and dioctanoyl peroxide for polymerisation in polar media. These peroxides are relatively thermally stable at the relevant polymerisation temperatures and, surprisingly, it was found that it is only necessary to use some of the initiator added in the production of the particles. Thus it is possible to produce particles which are activated by an initiator in dispersion polymerisation without using any post-swelling. Non-decomposed initiator will, when the polymerisation is over, exist swelled into the particles and in the reaction medium. The distribution will depend on the solubility of the initiator in the reaction medium versus that in the particles.

Since the solubility of the oil-soluble peroxides is poorer in water than in polar organic media, gradual addition of water will increase the fraction of initiator in the particles. Initiator-activated particles are very favourable for use as seed for further production of particles from vinyl monomers. By filtration, possibly decanting and washing with water, the particles can first be transferred to an aqueous medium. In order to facilitate the swelling of the monomer and the reaction speed in the second stage, it is often advantageous to wash the particles well as the steric stabiliser can have a tendency to lower/prevent the diffusion of the monomer. A redox system can be used to increase the decomposition speed of the peroxide in this second stage, for example ascorbic acid in combination with copper ions. Norwegian patent application 961625 (Norsk Hydro) describes the use of dispersion polymerisation to produce seed particles which, according to this method, are used to produce special PVC particles.

To make the particles resistant to chemicals and to increase their temperature stability, the particles have been cross-linked. For methyl methacrylate, MMA, it is most advantageous to use multi-functional acrylates such as ethylene glycol dimethacrylate, EGDMA, or allyl methacrylate, ALMA, while for styrene it is advantageous to use divinyl benzene, DVB. The typical concentration of the cross-linking reagent is 0.1–0.5% of the mono-functional monomer concentration. By cross-linking the particles, it is also possible to build up nuclei/shell particles by having a high proportion of cross-linker in the initial monomer mixture and subsequently adding the mono-functional monomer. Monomer can also be added subsequently as a separate seed polymerisation as described above.

To activate polymethacrylate, PMMA, particles with one functional group, methyl methacrylate, possibly in combination with a multi-functional acrylate, was copolymerised with glycidyl methacrylate, GMA. This can be done by adding vinyl monomer with one active group from the start of polymerisation or later in the process depending on the properties required for the particles. Correspondingly, in the production of MMA-GMA copolymer, the molar weight was found to increase as the GMA fraction increased.

The present invention also shows that comonomers can be used to control the molar weight of the polymer formed in a dispersion polymerisation system as the solubility of the polymer oligomer formed in the medium is changed. Contrary to that which is common in traditional polymerisation methods for particle production, it was found that the molar weight of the MMA/EGDMA copolymer decreases as more EGDMA is added even though EGDMA is multi-functional and will act as a cross-linker in the copolymer. PMMA particles can also be transamidised with separation of methanol by adding $NH_3$ in a closing stage of the polymerisation process. This is a relatively slow process and it is advantageous to increase the temperature and possibly also the pressure. Ammonia can be dissolved in an organic medium or in water. As the polymerisation medium, possibly mixed with a polar medium like water, will not swell the particles to any great degree, amidation will only take place on the outer layer of the particles. To obtain transamidation throughout the particle matrix, the particles must be swelled with a suitable solvent. Ammonia produces primary amides by means of a reaction with the ester group in the methyl methacrylate and no cross-links will be formed. To obtain a homogeneous distribution of amide groups in the particles, it will be more advantageous to copolymerise MMA with, for example, acryl amide.

EXAMPLES

The maximum particle swelling was measured by a varying quantity of homogenised solution consisting of an organic compound (5 g), water (10 g) and sodium lauryl sulphate (0.01 g) being added to the particles (1 g). The mean weight and molar weight ($M_w$ and $M_n$) were determined with GPC analyses in tetrahydrofurane with polystyrene as the standard. The conversion in the process was determined gravimetrically.

A 1 Standard Polymethyl Methacrylate, PMMA, Particles

Polymerisation of methyl methacrylate, MMA, was carried out in methanol with poly(vinyl pyrrolidone), PVP, with $M_w$=40.000 as the steric stabiliser. The initiator was 2,2-azobis(isobutyronitrile), AIBN. 2-ethyl hexyl thioglycolate, ETG, was added from the start or at a given time during the polymerisation to produce a fraction of low-molecular material.

| Materials | % weight |
|---|---|
| MMA | 10–15 |
| Methanol | 80–85 |
| PVP K30 | 2.5–5.0 |
| AIBN | 0.1–0.4 |
| ETG | 0–0.06 |

Depending on the exact recipe used, particles were produced in the size range 1–14 μm with a narrow distribution. When a chain-transfer agent was used from the start, the distribution was wider.

A 1.1

A solution of PVP K30 (10.00 g) in methanol (175.75 g) was added to a reactor (500 ml) and the mixture was boiled in an $N_2$ atmosphere for 1 hour. The mixture was cooled to 55° C. before the addition of methyl methacrylate (25.00 g). A mixture of ETG (0.15 g), AIBN (0.30 g) and methanol (39.00 g) was added when the temperature was stable at 55° C. Polymerisation was carried out for 48 hours. Spherical particles with a diameter of 12.5 μm were obtained with a fraction of particles of 4 μm.

A 1.2

A solution of PVP K30 (93.75 g) in methanol (2636.25 g) was added to a reactor (5.00 l) and the mixture was boiled in an $N_2$ atmosphere for 1 hour with an agitation speed of 50 RPM. The mixture was cooled to 54.0° C. before the addition of methyl methacrylate (375.00 g). A mixture of AIBN (9.00 g) and methanol (585.00 g) preheated to 30° C. was added when the temperature in the reactor was stable at 54.0° C. During the addition, the agitation speed was increased to 200 RPM. The total polymerisation time was 48 hours and a conversion of 94% was achieved. Spherical particles with a narrow distribution and a diameter of 8 μm were produced. The mean molar weight was found to be: $M_w$=78940 and $M_n$=25286. The degree of swelling in volume in a 1,2-dichloroethane-water emulsion was determined at approximately 80 times.

A 1.3

A solution of PVP K30 (93.75 g) in methanol (2636.25 g) was added to a reactor (5.00 l) and the mixture was boiled in an $N_2$ atmosphere for 1 hour with an agitation speed of 50 RPM. The mixture was cooled to 54.0° C. before the addition of methyl methacrylate (375.00 g). A mixture of AIBN (9.00 g) and methanol (585.00 g) preheated to 30° C. was added when the temperature in the reactor was stable at 54° C. During the addition, the agitation speed was increased to 200 RPM. After 3 hours' polymerisation, the temperature was gradually increased over 3 hours to 60.0° C. The total polymerisation time was 10 hours and a conversion of 91% was achieved. Spherical particles with a narrow distribution and a diameter of 8 μm were produced. The mean molar weight was found to be: $M_w$=54220 and $M_n$=18904. The degree of swelling in volume in a finely distributed 1,2-dichloroethane-water emulsion was determined at over 100 times.

A 1.4

A solution of PVP K30 (93.75 g) in methanol (2636.25 g) was added to a reactor (5.00 l) and the mixture was boiled in an $N_2$ atmosphere for 1 hour with an agitation speed of 50 RPM. The mixture was cooled to 51.5° C. before the addition of methyl methacrylate (375.00 g). A mixture of AIBN (11.20 g) and methanol (585.00 g) preheated to 30° C. was added when the temperature in the reactor was stable at 51.5° C. During the addition, the agitation speed was increased to 200 RPM. After 3 hours' polymerisation, the temperature was gradually increased over 3 hours to 60.0° C. The total polymerisation time was 10 hours and a conversion of 94% was achieved. Spherical particles with a narrow distribution and a diameter of 8 μm were produced. The mean molar weight was found to be: $M_w$=44 519 and $M_n$=11883.

The degree of swelling in volume in a finely distributed 1,2-dichloroethane-water emulsion was determined at over 100 times.

A 1.5

The same as example A 1.3, but after 7 hours' polymerisation, a mixture of ETG (2.00 g) and methanol (75.00 g) was added very slowly. The total polymerisation time was 10 hours and the conversion was 92%. Spherical particles with a narrow distribution and a diameter of 8 μm were produced. The mean molar weight was found to be: $M_w$=52891 and $M_n$=17106.

A 2 Didecanoyl Peroxide-activated PMMA Particles

A 2.1

A solution of polyvinyl pyrrolidone, PVP K30, (93.75 g) in methanol (2635.00 g) was added to a reactor (5.00 l) and the mixture was boiled in an $N_2$ atmosphere for 1 hour with an agitation speed of 50 RPM. The mixture was cooled to 55.0° C. before the addition of methyl methacrylate, MMA, (375 g). When the temperature was stable at 55.0° C., a mixture of didecanoyl peroxide (18.77 g) and methanol (585 g), which had been preheated to 30° C., was added. During the addition, the agitation speed was increased to 200 RPM. The polymerisation was concluded after 24 hours with a conversion of MMA of 90%. The particles produced had a diameter of 8 μm.

A 2.2

A solution of polyvinyl pyrrolidone, PVP K30, (4.725 kg) in methanol (117.2 kg) was added to a reactor (250.00 l) and the mixture was boiled in an $N_2$ atmosphere for 1 hour. The mixture was cooled to 55.0° C. before the addition of methyl methacrylate, MMA, (18.900 kg). The temperature was adjusted to 54.0° C. and when it was stable, a mixture of didecanoyl peroxide (1.892 kg) and methanol (45.45 kg) was added. During the addition, the agitation speed was kept constant. The temperature in the reactor was kept constant at 54.0° C. The polymerisation was concluded after 20 hours with a conversion of MMA of 87%. The particles produced had an approximately bi-disperse distribution with a diameter of 5 and 13 μm.

A 2.3

A solution of polyvinyl pyrrolidone, PVP K30, (4.725 kg) in methanol (117.2 kg) was added to a reactor (250.00 l) and the mixture was boiled in an $N_2$ atmosphere for 1 hour. The mixture was cooled to 53.0° C. before the addition of methyl methacrylate, MMA, (18.900 kg). When the temperature was stable at 50.0° C., a mixture of didecanoyl peroxide (1.892 kg) and methanol (45.45 kg), which had been preheated to 31.6° C., was added. During the addition, the agitation speed was increased from 60 to 120 RPM. After 2 hours, the temperature in the reactor was gradually increased over 2 hours to 60° C. The polymerisation was concluded after 10 hours with a conversion of MMA of 89%. The particles produced had a diameter of 6 μm. The particles consisted of 1.1 % weight didecanoyl peroxide. After vacuum distillation with continuous addition of water, the content increased to 4.3 % weight.

A 3 Epoxy-activated PMMA Particles

A 3.1

A solution of PVP K30 (93.75 g) in methanol (2636.25 g) was added to a reactor (5.00 l) and the mixture was boiled in an $N_2$ atmosphere for 1 hour with an agitation speed of 50 RPM. The mixture was cooled to 53.0° C. before the addition of methyl methacrylate (337.50 g) and glycidyl methacrylate (37.50 g). A mixture of AIBN (9.00 g) and methanol (585.00 g) preheated to 30° C. was added when the temperature in the reactor was stable at 53.0° C. During the addition, the agitation speed was increased to 200 RPM.

After 3 hours' polymerisation, the temperature was gradually increased over 3 hours to 60.0° C. The total polymerisation time was 10 hours and a conversion of 93% was achieved. Spherical particles with a narrow distribution and a diameter of 5 μm were produced. The concentration of epoxy groups was measured at 0.616 mmol/g particles. The mean molar weight was found to be: $M_w$=111090 and $M_n$=34376.

A 4 Cross-linked PMMA Particles

A4.1

A solution of PVP K30 (93.75 g) in methanol (2636.25 g) was added to a reactor (5.00 l) and the mixture was boiled in an $N_2$ atmosphere for 1 hour with an agitation speed of 50 RPM. The mixture was cooled to 53.0° C. before the addition of the monomer mixture of methyl methacrylate (337.50 g) and ethylene glycol dimethacrylate (0.750 g). A mixture of AIBN (9.00 g) and methanol (585.00 g) preheated to 30° C. was added when the temperature in the reactor was stable at 53.0° C. During the addition, the agitation speed was increased to 200 RPM. After 3 hours' polymerisation, the temperature was gradually increased over 3 hours to 60.0° C. The total polymerisation time was 10 hours and a conversion of 91% was achieved. Spherical particles with a narrow distribution and a diameter of 8 μm were produced.

A 4.2

A solution of PVP K30 (93.75 g) in methanol (2636.25 g) was added to a reactor (5.00 l) and the mixture was boiled in an $N_2$ atmosphere for 1 hour with an agitation speed of 50 RPM. The mixture was cooled to 53.0° C. before the addition of the monomer mixture of methyl methacrylate (356.20 g), glycidyl methacrylate (18.75 g) and ethylene glycol dimethacrylate (0.375 g). A mixture of AIBN (9.00 g) and methanol (585.00 g) preheated to 30° C. was added when the temperature in the reactor was stable at 53.0° C. During the addition, the agitation speed was increased to 200 RPM. After 3 hours' polymerisation, the temperature was gradually increased over 3 hours to 60.0° C. The total polymerisation time was 10 hours and a conversion of 93% was achieved. Spherical particles with a narrow distribution and a diameter of 5 μm were produced. The concentration of epoxy groups was measured at 0.319 mmol/g particles. The mean molar weight was found to be: $M_w$=93003 and $M_n$=29110.

A 5 Amide-activated PMMA Particles

A 5.1

The same as in example A 4.1. After 10 hours, 25% aqueous NH3 solution (2.00 l) was added and the methyl ester function in the particles was transamidised to methacryl amide at 64° C. for 10 hours.

A 6 Polymerisation with Didecanoyl-activated PMMA Particles

See particles from example A 2.3 (6 μm, 7.50 g), sodium lauryl sulphate (0.25 g), potassium iodide (0.19 g), methyl hydroxyl propyl cellulose dissolved in distilled water (2.00 g/l. 1.00 g), copper sulphate pentahydrate (2.00 mg) and water (630.40 g) were added to a reactor (1.10 l). After evacuation, vinyl chloride monomer, VCM, (40 ml) was added and swelled in for 1 hour at 20° C. The temperature was increased to 60° C. and VCM (130 ml) was added continuously for 6 hours with a piston pump. To regulate the polymerisation speed, a solution of ascorbic acid (4.00 g/l, 2.00 ml) was added. The reaction was continued until the pressure had fallen by 2.5 bar. Particles with a narrow distribution and a diameter of 14 μm were produced.

A 7 Standard Polystyrene Particles

A 7.1

A solution of PVP K30 (2.64 g) in ethanol (700 g) was added to a reactor (2.00 l) and heated to boiling point; it was subsequently kept at boiling point in a nitrogen atmosphere for 1 hour. The temperature was adjusted to 70° C. and styrene (250 g) was added. When the temperature was stable (T=70° C.), a preheated solution (T=31° C.) of AIBN (1.60 g) in ethanol (50 g) was added. During the addition of the solution, the agitation was increased from 50 to 150 RPM. The polymerisation was concluded after 24 hours. The particles produced had a narrow distribution and a diameter of 6 μm. The degree of swelling in volume in a toluene emulsion was determined at approximately 50 times.

A 7.2

A solution of PVP K30 (2.64 g) in ethanol (700 g) was added to a reactor (2.00 l) and heated to boiling point; it was subsequently kept at boiling point in a nitrogen atmosphere for 1 hour. The temperature was adjusted to 68° C. and styrene (250 g) was added. When the temperature was stable (T=68° C.), a preheated solution (T=31° C.) of AIBN (3.2 g) in ethanol (50 g) was added. During the addition of the solution, the agitation was increased from 50 to 150 RPM. After 2 hours' polymerisation, the temperature was gradually increased over 3 hours to 75° C. The polymerisation was concluded after 10 hours. The particles produced had a narrow distribution and a diameter of 6 μm. The degree of swelling in volume in a finely-distributed toluene-water emulsion was determined at approximately 350 times.

A 8 Polystyrene with Dioctanoyl Peroxide

A solution of polyvinyl pyrrolidone, PVP K30, (5.15 g) in ethanol (236.07 g) was added to a reactor (500 ml) and heated to boiling point; it was subsequently kept at boiling point for 1 hour in an $N_2$ atmosphere. The temperature was adjusted to 70° C. and styrene (78.04 g) was added. When the temperature was stable at 70° C., a mixture of dioctanoyl peroxide (4.08 g) and ethanol (35.24 g) was added and polymerisation was carried out at 70° C. for 24 hours. The particles produced had a diameter of 5 μm and a narrow distribution.

What is claimed is:

1. A procedure for producing self activated polymer particles having a narrow size distribution, with mean particle size in the range from 0.5 to 15 μm by free radical polymerization of vinyl monomers(s) which is(are) easily soluble in the polymerization medium while the polymer precipitates out with subsequent nucleation of the particles, wherein, after the number of particles is constant, the temperature is gradually increased over a certain interval of time to form molecules with a lower molecular weight and increase conversion speed.

2. A procedure in accordance with claim 1, wherein an activator/initiator or a solution containing an activator/initiator is preheated before being added to the reactor.

3. A procedure in accordance with claim 2, wherein agitation speed is increased during the addition of the activator/initiator or a solution containing an activator/initiator.

4. A procedure for making functional polymethyl methacrylate, PMMA, particles with epoxy groups, wherein the particles are produced in accordance with claim 1, and an epoxy vinyl compound in a ratio of 0–50% by weight of methyl methacrylate, MMA, is added to the reactor.

5. A procedure in accordance with claim 1, wherein the vinyl monomers are a multifunctional vinyl monomer in a ratio of 0.001–5% by weight and methyl methacrylate, MMA, in a ratio of 99.999–99.5% by weight.

6. A procedure in accordance with claim 1, wherein the vinyl monomers are a combination of a multifunctional vinyl monomer, an epoxy vinyl compound and methyl methacrylate, MMA.

7. A procedure in accordance with claim 1, wherein a chain-transfer agent is added at any time after nucleation of the particles is finished.

8. A procedure in accordance with claim 1, wherein the particles are polymethyl methacrylate, PMMA, and ammonia, $NH_3$, is added to the medium at a late stage of the polymerization to transamidise the particles.

9. A procedure in accordance with claim 4, wherein the amount of epoxy vinyl compound is 0–15% by weight.

10. A procedure in accordance with claim 4, wherein the epoxy vinyl compound is added to the reactor at the start of the polymerization.

11. A procedure in accordance with claim 4, wherein the epoxy vinyl compound is added to the reactor subsequent to the start of the polymerization in batches or continuously.

12. A procedure in accordance with claim 5, wherein the amount of the multifunctional vinyl monomer is 0.1–0.5% by weight.

13. A procedure in accordance with claim 5, wherein the multifunctional vinyl monomer is added to the reactor at the start of the polymerization.

14. A procedure in accordance with claim 5, wherein the multifunctional vinyl monomer is added to the reactor subsequent to the start of the polymerization in batches or continuously.

15. A procedure in accordance with claim 5, wherein both a multifunctional vinyl monomer and an epoxy-activated vinyl monomer are added to the reactor.

16. A procedure in accordance with claim 5, wherein a chain-transfer agent is added at any time after nucleation of the particles is finished.

17. A procedure in accordance with claim 1, wherein the polymerization medium is an organic medium, and such a large surplus of oil-soluble activator/initiator is used in the polymerization of the particles that it is not necessary to add any more when the particles are used as seed in a subsequent polymerization stage, and conducting the subsequent polymerization stage.

18. A procedure in accordance with claim 17, wherein a polar medium different from the organic medium is added gradually during evaporation of the organic medium.

19. A procedure in accordance with claim 18, wherein the polar medium is water.

20. A procedure in accordance with claim 1, wherein the polymerization medium consists essentially of an organic medium.

* * * * *